United States Patent
Mozumdar et al.

(10) Patent No.: US 10,868,730 B2
(45) Date of Patent: Dec. 15, 2020

(54) METHODS, SYSTEMS, AND COMPUTER READABLE MEDIA FOR TESTING NETWORK ELEMENTS OF AN IN-BAND NETWORK TELEMETRY CAPABLE NETWORK

(71) Applicant: Keysight Technologies, Inc., Santa Rosa, CA (US)

(72) Inventors: Suvendu Mozumdar, Kolkata (IN); Kingshuk Mandal, Kolkata (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/869,129

(22) Filed: May 7, 2020

(65) Prior Publication Data
US 2020/0267059 A1    Aug. 20, 2020

Related U.S. Application Data

(63) Continuation of application No. 16/181,309, filed on Nov. 5, 2018, now Pat. No. 10,686,671.

(51) Int. Cl.
*H04L 12/26* (2006.01)
*H04L 12/24* (2006.01)

(52) U.S. Cl.
CPC ............ *H04L 41/145* (2013.01); *H04L 41/12* (2013.01)

(58) Field of Classification Search
CPC ....... H04L 41/145; H04L 41/12; H04L 41/24; H04L 41/0803
See application file for complete search history.

(56) References Cited

U.S. PATENT DOCUMENTS

| | | |
|---|---|---|
| 7,272,822 B1 | 9/2007 | Riggins et al. |
| 8,028,276 B1 | 9/2011 | Bessonov |
| 8,402,435 B1 | 3/2013 | Spiro |
| 9,891,898 B1 | 2/2018 | Tonsing |
| 10,164,829 B1 | 12/2018 | Watson et al. |
| 10,225,381 B1 | 3/2019 | Bosshart |
| 10,587,491 B1 | 3/2020 | Volpe |

(Continued)

FOREIGN PATENT DOCUMENTS

CN    107749802 A    3/2018

OTHER PUBLICATIONS

Final Office Action for U.S. Appl. No. 16/269,798 (dated May 8, 2020).

(Continued)

*Primary Examiner* — Siren Wei (57) ABSTRACT

Methods, systems, and computer readable media for testing network elements of an in-band telemetry (INT)-capable network are disclosed. One exemplary method includes generating, by a network test tool device, at least one INT test system data packet that includes emulated INT metadata that represents telemetry parameters corresponding to a plurality of emulated network devices. The method also includes sending the at least one INT test system data packet to an INT sink device and generating, by the INT sink device, an INT telemetry report derived from the INT metadata extracted from the at least one INT test system data packet. The method also includes forwarding the generated INT telemetry report to a software defined network (SDN) controller entity.

15 Claims, 5 Drawing Sheets

(56) References Cited

U.S. PATENT DOCUMENTS

| | | | |
|---|---|---|---|
| 10,686,671 | B1 | 6/2020 | Mozumdar et al. |
| 10,733,088 | B1 | 8/2020 | Sommers |
| 2006/0168205 | A1 | 7/2006 | Barron et al. |
| 2006/0259629 | A1 | 11/2006 | Usmani et al. |
| 2009/0112505 | A1 | 4/2009 | Engel et al. |
| 2011/0183613 | A1 | 7/2011 | Nocera |
| 2012/0033678 | A1 | 2/2012 | Page et al. |
| 2013/0152047 | A1 | 6/2013 | Moorthi et al. |
| 2014/0157245 | A1 | 6/2014 | Krueger |
| 2015/0088827 | A1* | 3/2015 | Xu .......................... G06F 3/065 707/634 |
| 2015/0172208 | A1 | 6/2015 | DeCusatis et al. |
| 2015/0234725 | A1 | 8/2015 | Cillis et al. |
| 2015/0365325 | A1 | 12/2015 | Hwang et al. |
| 2016/0234087 | A1 | 8/2016 | Nyerges et al. |
| 2017/0093986 | A1 | 3/2017 | Kim et al. |
| 2017/0237632 | A1 | 8/2017 | Hegde et al. |
| 2017/0322873 | A1 | 11/2017 | Morris |
| 2018/0210823 | A1 | 7/2018 | Vorganti |
| 2018/0255027 | A1 | 9/2018 | Winig et al. |
| 2018/0316608 | A1* | 11/2018 | Dowlatkhah ......... H04L 45/308 |
| 2019/0014395 | A1* | 1/2019 | Anand ..................... H04L 45/38 |
| 2019/0065349 | A1 | 2/2019 | Sharma et al. |
| 2019/0199654 | A1 | 6/2019 | Pope et al. |
| 2019/0222481 | A1* | 7/2019 | Hira ........................ H04L 43/10 |
| 2019/0260682 | A1 | 8/2019 | Ewert |
| 2019/0354406 | A1 | 11/2019 | Ganguli et al. |
| 2019/0379588 | A1 | 12/2019 | Rao |
| 2020/0021512 | A1 | 1/2020 | Naskar et al. |

OTHER PUBLICATIONS

Notice of Allowance and Fee(s) Due for U.S. Appl. No. 16/290,426 (dated May 7, 2020).

Non-Final Office Action for U.S. Appl. No. 16/035,534 (dated Apr. 13, 2020).

Notice of Allowance and Fee(s) Due for U.S. Appl. No. 16/181,309 (dated Mar. 19, 2020).

Notice of Allowance and Fee(s) Due for U.S. Appl. No. 16/290,426 (dated Mar. 18, 2020).

Non-Final Office Action for U.S. Appl. No. 16/269,498 (dated Jan. 28, 2020).

Non-Final Office Action for U.S. Appl. No. 16/181,309 (dated Oct. 28, 2019).

Commonly-assigned, co-pending U.S. Appl. No. 16/446,318 for "Methods, Systems, and Computer Readable Media for Configuring a Test System Using Source Code of a Device Being Tested," (Unpublished, filed Jun. 19, 2019).

Commonly-assigned, co-pending U.S. Appl. No. 16/290,426 for "Methods, Systems, and Computer Readable Media for Testing a Network Node or a Related Application Programming Interface Using Source Code Metadata," (Unpublished, filed Mar. 1, 2019).

Zhang et al., "HyperVDP: High-Performance Virtualization of the Programmable Data Plane," IEEE Journal on Selected Areas in Communications, vol. 37, No. 3, pp. 556-569 (Mar. 2019).

Commonly-assigned, co-pending U.S. Appl. No. 16/269,498 for "Methods, Systems, and Computer Readable Media for Providing Dynamically Configurable, Distributed Network Visibility Device,"(Unpublished, filed Feb. 6, 2019).

"Dynamic Test-Based P4 Packet Blaster Hardware Configuration," IPCOM000257013D, pp. 1-6 (Jan. 10, 2019).

"The World's Fastest & Most Programmable Networks," Barefoot Networks, https://barefootnetworks.com/resources/worlds-fastest-most-programmable-networks/, pp. 1-10 (Feb. 6, 2019).

"P4Runtime Specification," The P4.org API Working Group, Version 1.0.0, pp. 1-97 (Jan. 29, 2019).

"P4Runtime Specification," The P4.org API Working Group, Version 1.0.0-rc4, pp. 1-72 (Jan. 25, 2019).

"Cubro Sessionmaster EXA48600," Cubro Network Visibility, pp. 1-5 (2019).

"p4lang / switch," https://github.com/p4lang/switch, pp. 1-4 (Copyright 2019).

"Sparkline," Wikipedia, https://en.wikipedia.org/wiki/Sparkline, pp. 1-3 (2019).

Hill et al., "Tracking Network Flows with P4," University of Amsterdam, System and Network Engineering, pp. 1-16. (2018).

Commonly-assigned, co-pending U.S. Appl. No. 16/181,309 for "Methods, Systems, and Computer Readable Media for Testing Network Elements of an In-Band Network Telemetry Capable Network," (Unpublished, filed Nov. 5, 2018).

Rodriguez et al., "BB-Gen: A Packet Crafter for P4 Target Evaluation", SIGCOMM Posters and Demos '18, pp. 1-3 (Aug. 20-25, 2018).

Commonly-assigned, co-pending U.S. Appl. No. 16/035,534 for "Methods, Systems, and Computer Readable Media for Testing a Network Node Using Source Code," (Unpublished, filed Jul. 13, 2018).

Saha et al., "Fault Detection Effectiveness of Source Test Case Generation Strategies for Metamorphic Testing," MET, arXiv:1802. 07361v1, pp. 1-8 (Feb. 20, 2018).

Nötzli, "p4pktgen: Automated Test Case Generation for P4 Programs," SOSR '18, pp. 1-7 (Mar. 28-29, 2018).

Anand et al., "POINT: An Intent-driven Framework for Integrated Packet-Optical In-band Network Telemetry," Infinera Corporation, pp. 1-6 (2018).

Liang et al., "In-band Network Function Telemetry," Tsinghua University, pp. 1-3 (Aug. 20-25, 2018).

Iša et al., "Verification of Generated RTL from P4 Source Code," 2018 IEEE 26th International Conference on Network Protocols, pp. 1-2 (2018).

"Test Case Management for Improved QA," Perforce, pp. 1-13 (2018).

"Cubro's network packet broker evolution," Cubro Blog, pp. 1-3 (Jan. 15, 2018).

McKeown et al., "P4 Runtime—Putting the Control Plane in Charge of the Forwarding Plane," The P4 Language Consortium, pp. 1-6 (Dec. 4, 2017).

P4 (programming language), Wikipedia, https://en.wikipedia.org/w/index/php?title=P4_(programming_language)&oldid=812348591, pp. 1-3 (Nov. 27, 2017).

"P416 Language Specification," The P4 Language Consortium, version 1.0.0, pp. 1-129 (May 22, 2017).

Hyun et al., "Knowledge-Defined Networking using In-band Network Telemetry," Department of Computer Science and Engineering, POSTECH, pp. 1-4 (2017).

Van, Tu Nguyen et al., "Towards ONOS-based SDN Monitoring using In-band Network Telemetry," Department of Computer Science and Engineering, POSTECH, pp. 1-6 (2017).

Shahbaz et al., "PISCES: A Programmable, Protocol-Independent Software Switch," SIGCOMM '16, pp. 1-14 (Aug. 22-26, 2016).

Papneja et al., "Basic BGP Convergence Benchmarking Methodology for Data-Plane Convergence," RFC 7747, pp. 1-35 (Apr. 2016).

Kim et al., "In-band Network Telemetry via Programmable Dataplanes," pp. 1-2 (2015).

Ginoza, "Request for Comments Summary RFC No. 2800-2899," RFC 2899, pp. 1-22 (May 2001).

Bradner et al., "Benchmarking Methodology for Network Interconnect Devices,"RFC 2544, pp. 1-31 (Mar. 1999).

Notice of Allowance and Fee(s) Due for U.S. Appl. No. 16/035,534 (dated Aug. 27, 2020).

Commonly-assigned, co-pending U.S. Appl. No. 17/001,614 for "Methods, Systems and Computer Readable Media for Network Congestion Control Tuning," (Unpublished, filed Aug. 24, 2020).

Beltman et al., "Collecting telemetry data using P4 and RDMA," University of Amsterdam, pp. 1-12 (2020).

Liu et al., "HPCC++: Enhanced High Precision Congestion Control," Network Working Group, pp. 1-15 (Jun. 17, 2020).

"Traffic Management User Guide (QFX Series and EX4600 Switches)," Juniper Networks, pp. 1-1121 (Mar. 18, 2020).

"H3C S6850 Series Data Center Switches," New H3C Technologies Co., Limited, pp. 1-13 (Mar. 2020).

(56) References Cited

OTHER PUBLICATIONS

Even et al, "Data Center Fast Congestion Management," pp. 1-15 (Oct. 23, 2019).
Li et al., "HPCC: High Precision Congestion Control," SIGCOMM '19, pp. 1-15 (Aug. 19-23, 2019).
"RoCE Congestion Control Interoperability Perception vs. Reality," Broadcom White Paper, pp. 1-8 (Jul. 23, 2019).
"What is RDMA?," Mellanox, pp. 1-3 (Apr. 7, 2019).
Mandal, "In-band Network Telemetry—More Insight into the Network," Ixia, https://www.ixiacom.com/company/blog/band-network-telemetry-more-insight-network, pp. 1-9 (Mar. 1, 2019).
Geng et al., "P4QCN: Congestion Control Using P4-Capable Device in Data Center Networks," Electronics, vol. 8, No. 280, pp. 1-17 (Mar. 2, 2019).
"Understanding DC-QCN Algorithm for RoCE Congestion Control," Mellanox, pp. 1-4 (Dec. 5, 2018).
"Data Center Quantized Congestion Notification (DCQCN)," Juniper Networks, pp. 1-7 (Oct. 4, 2018).
"Understanding RoCEv2 Congestion Management," Mellanox, https://community.mellanox.com/s/article/understanding-rocev2-congestion-management, pp. 1-6 (Dec. 3, 2018).
Mittal et al, "Revisiting Network Support for RDMA," SIGCOMM '18, pp. 1-14 (Aug. 20-25, 2018).
Varadhan et al., "Validating ROCEV2 in the Cloud Datacenter," OpenFabrics Alliance, 13th Annual Workshop 2017, pp. 1-17 (Mar. 31, 2017).
Zhu et al, "ECN or Delay: Lessons Learnt from Analysis of DCQCN and TIMELY," CoNEXT '16, pp. 1-15 (Dec. 12-15, 2016).
Kim et al., "In-band Network Telemetry (INT)," pp. 1-28 (Jun. 2016).
Zhu et al., "Congestion Control for Large-Scale RDMA Deployments," SIGCOMM '15, pp. 1-14 (Aug. 17-21, 2015).
Zhu et al., "Packet-Level Telemetry in Large Datacenter Networks," SIGCOMM '15, pp. 1-13 (Aug. 17-21, 2015).
Mittal et al., "TIMELY: RTT-based Congestion Control for the Datacenter," SIGCOMM '15, pp. 1-14 (Aug. 17-21, 2015).
"RoCE in the Data Center," Mellanox Technologies, White Paper, pp. 1-3 (Oct. 2014).
Barak, "Introduction to Remote Direct Memory Access (RDMA)," http://www.rdmamojo.com/2014/03/31/remote-direct-memory-access-rdma/, pp. 1-14 (Mar. 31, 2014).
"Quick Concepts Part 1—Introduction to RDMA," ZCopy, Education and Sample Code for RDMA Programming, pp. 1-5 (Oct. 8, 2010).
Alizadeh et al., "Data Center TCP (DCTCP)," SIGCOMM '10, pp. 1-12 (Aug. 30-Sep. 3, 2010).
Grochla, "Simulation comparison of active queue management algorithms in TCP/IP networks," Telecommunication Systems, pp. 1-9 (Oct. 2008).
Advisory Action and AFCP 2.0 Decision for U.S. Appl. No. 16/269,498 (dated Jul. 27, 2020).

* cited by examiner

METHODS, SYSTEMS, AND COMPUTER READABLE MEDIA FOR TESTING NETWORK ELEMENTS OF AN IN-BAND NETWORK TELEMETRY CAPABLE NETWORK

CROSS-REFERENCE TO RELATED APPLICATIONS

This application is a continuation of U.S. patent application Ser. No. 16/181,309, filed Nov. 5, 2018, the disclosure of which is herein incorporated by reference in their entirety.

TECHNICAL FIELD

The subject matter described herein relates to network equipment testing. More particularly, the subject matter described herein relates to methods, systems, and computer readable media for testing network elements of an in-band network telemetry (INT)-capable network.

BACKGROUND

In-band network telemetry (INT) is a framework configured to permit the collection and reporting of a network state, by the data plane, without requiring any intervention on the part of the control plane. In the INT architectural model, data packets contain INT header fields, a part of which is interpreted as telemetry instructions by network devices. The instructions contained in the header fields instruct INT-capable devices what INT metadata needs to be collected and written into the INT packet as the packet traverses the network. The INT system architecture includes both INT traffic sources and INT traffic sinks. A traffic source is a network element that is configured to embed the instructions in normal data packets. Likewise, traffic sinks are network elements that are configured to retrieve the collected results of these instructions in the form of device-specific information, thereby allowing the traffic sinks or a central controller to monitor the exact data plane state that the data packets observed while being forwarded within the network. At present, conducting INT-based testing of traffic sinks and associated network controllers is difficult due to the numerous network elements that are needed to produce realistic and accurate results.

Accordingly, there exists a need for methods, systems, and computer readable media for testing network elements of an INT-capable network.

SUMMARY

According to one aspect, the subject matter described herein includes a method for testing network elements of an INT-capable network. The method includes generating, by a network test tool device, at least one test system data packet that includes emulated INT instructions and metadata that represents telemetry parameters corresponding to a plurality of emulated network devices. The method also includes sending the at least one test system data packet to an INT sink device and generating, by the INT sink device, an INT telemetry report derived from the INT metadata extracted from the at least one INT test system data packet. The method also includes forwarding the generated INT telemetry report to a software defined network (SDN) controller entity.

In one example of the method, the SDN controller entity utilizes the INT telemetry report to assess the performance of an emulated network composed by the plurality of emulated network devices.

In one example of the method, the INT sink device is either a device under test or a switch device in a system under test.

In one example of the method, the SDN controller entity generates an instruction packet containing one or more instructions that direct the network test tool device to modify a network topology of the emulated network.

In one example of the method, the network test tool device modifies the emulated INT metadata included in the at least one INT test system data packet to record a change in the modified network topology.

In one example of the method, the telemetry parameters represent a user-defined test case specifying at least one predefined network event or at least one predefined network condition.

In one example of the method, the SDN controller entity provides, to a management engine in the network test tool device, a status description indicative of real-time control functionality in response to the receiving the INT telemetry report.

According to another aspect, the subject matter described herein includes a system for testing network elements of an INT-capable network. The system includes at least one processor and a memory. The system also includes a network test tool device comprising at least one processor, a memory, an INT traffic source emulation engine that when stored in memory and executed by the at least one processor is configured for generating at least one INT test system data packet that includes emulated INT instructions and metadata that represents telemetry parameters corresponding to a plurality of emulated network devices, and a management engine that when stored in memory and executed by the at least one processor is configured for sending the at least one INT test system data packet. The system further includes an INT network sink device configured for receiving the at least one INT test system data packet, for generating an INT telemetry report derived from the INT metadata extracted from the at least one INT test system data packet, and for forwarding the generated INT telemetry report to a software defined network (SDN) controller entity.

In one example of the system, the SDN controller entity utilizes the INT telemetry report to assess a performance of an emulated network composed by the plurality of emulated network devices.

In one example of the system, the INT sink device is either a device under test or a switch device in a system under test.

In one example of the system, the SDN controller entity generates an instruction packet (e.g., at least one non-INT packet) containing one or more instructions that direct the network test tool device to modify a network topology of the emulated network or the INT instruction, thereby modifying the type of INT metadata to be recorded by the INT transit devices.

In one example of the system, the network test tool device modifies the emulated INT metadata included in the at least one test system data packet to monitor the change in network topology.

In one example of the system, the telemetry parameters represent a user-defined test case specifying at least one predefined network event or at least one predefined network condition.

In one example of the system, the SDN controller entity provides to the network test tool device a status description indicative of real-time control functionality in response to the receiving the INT telemetry report.

As used herein, an INT header refers to a packet header that carries INT information. Examples of INT headers include a hop-by-hop header and a destination header.

As used herein, an INT packet refers to any packet containing an INT header.

As used herein, an INT instruction includes embedded packet instructions that indicate which INT metadata to collect. The collected data is written into an INT header.

As used herein, an INT source entity refers to a trusted entity that creates and inserts INT headers into the INT packets. The INT headers contain, at a minimum, INT instructions that indicate what data is to be collected. Examples of INT source entities include applications, end-host networking stacks, hypervisors, network interface controllers, and the like.

As used herein, an INT sink refers to a trusted entity that extracts the INT headers from INT packets and collects the path state information contained in the INT headers. The INT sink device is responsible for removing INT headers so as to make INT transparent to upper layers.

As used herein, and INT transit hop refers to a networking device that adds its own INT metadata to an INT packet by following the INT instructions in the INT header.

As used herein, INT metadata refers to telemetry information that is included in the INT header.

As used herein, an SDN controller entity can refer to either an SDN controller device or an SDN controller emulation.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by a processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for testing network elements of an INT-capable network are provided. In some embodiments, the disclosed subject matter includes a network test tool device configured for testing a P4-enabled INT sink device or a network element that utilizes the INT data, such as a SDN controller. Notably, the network test tool device can be configured to intelligently insert in-band telemetry metadata within INT test system data packets generated by the test tool device. In some embodiments, the telemetry metadata comprises telemetry data parameters and associated values that are initially defined by a user (e.g., via a control panel). In particular, the network test tool device can establish the telemetry parameters in such a manner that a specific network event or test condition can be emulated by the network test tool. The network test tool device subsequently sends the generated INT test system data packets to a DUT and/or SUT to test performance monitoring. Depending on the presence of INT header inside the test system data packets, the generation of a telemetry report message by an INT sink device can be triggered. The generated telemetry report message may then be forwarded to a network monitoring element, such as an SDN controller entity.

Reference will now be made in detail to exemplary embodiments of the present invention, examples of which are illustrated in the accompanying drawings. Wherever possible, the same reference numbers will be used throughout the drawings to refer to the same or like parts.

Figure 1:
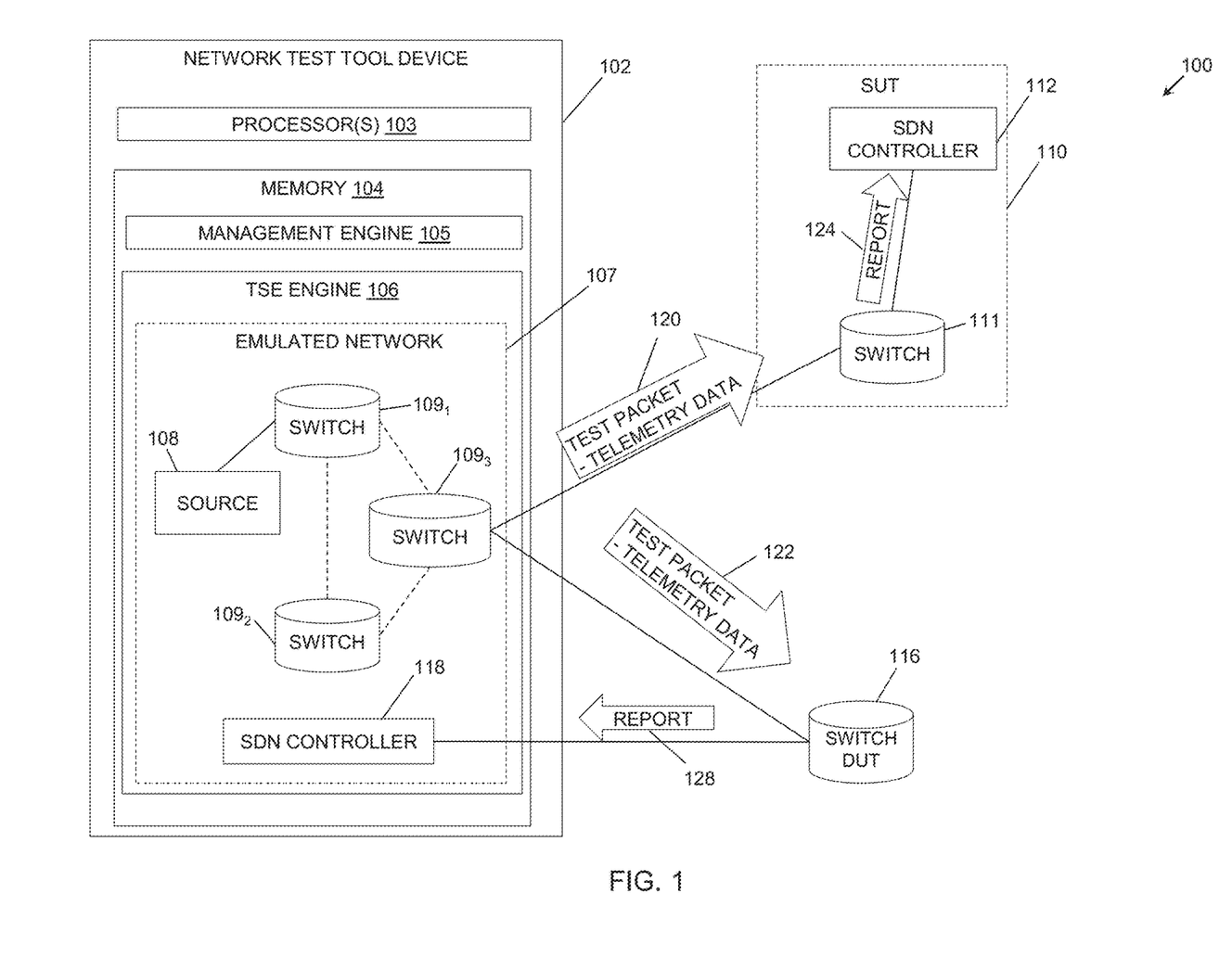
FIG. 1 is a block diagram illustrating an exemplary system for testing network elements of an INT-capable network according to an embodiment of the subject matter described herein.

FIG. 1 illustrates of a block diagram of a test environment network 100. A logical architecture of test environment network 100 is depicted in FIG. 1 as comprising a network test tool device 102, an INT capable system under test (SUT) 110, and an INT capable switch device under test (DUT) 116. In some embodiments, network test tool device 102 may include one or more processors 103 and a memory 104 that are collectively utilized to support an INT test management engine 105 and an INT traffic source emulation (TSE) engine 106. In some embodiments, processor(s) 103 may include a central processing unit (e.g., a single core or multiple processing cores), a microprocessor, a microcontroller, a network processor, an application-specific integrated circuit (ASIC), or the like. Likewise, memory 104 may comprise random access memory (RAM), flash memory, a magnetic disk storage drive, and the like. In some embodiments, memory 104 may be configured to store management engine 105 and TSE engine 106.

Figure 2:
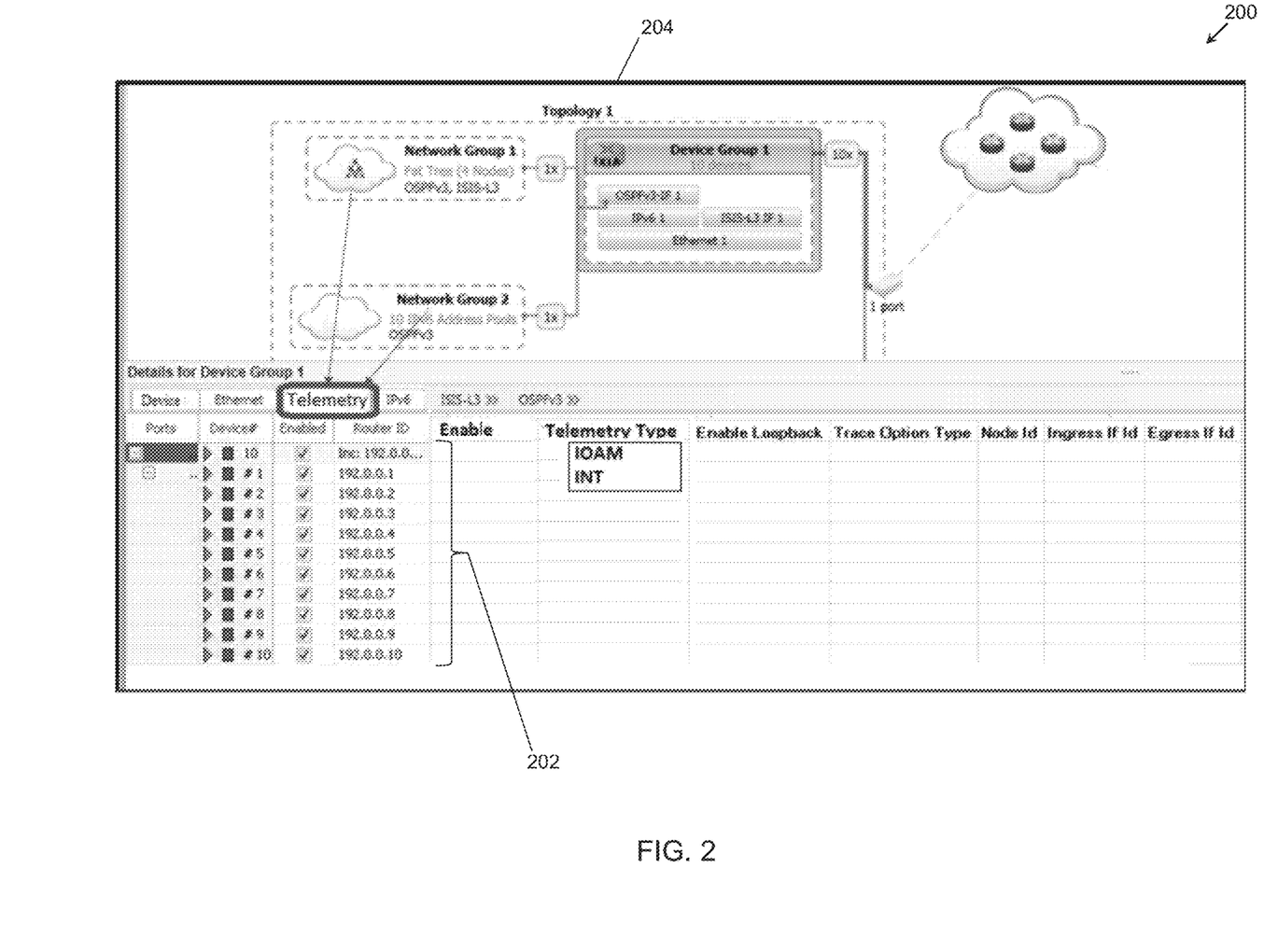
FIG. 2 is a block diagram illustrating an exemplary user interface for testing network elements of an INT-capable network according to an embodiment of the subject matter described herein.

In some embodiments, network test tool device 102 and/or management engine 105 is configured to receive messages and instructions from a client application or a test console utilized by a system administrator. In some embodiments, the test console (not shown in FIG. 1) is an integral part of the network test tool device 102 includes a test console element that can be presented to a user or system administrator in the form of a graphical user interface (GUI). In alternate embodiments, the test console may be communicatively connected to network test tool device 102 via a wired or wireless connection. Using the test console, the system administrator can issue instructions that define a test case for testing either a DUT or SUT in test environment network 100. For example, the instructions provided by the system administrator can include parameters for establishing an emulated network that comprises a plurality of emulated network devices (e.g., emulated switches, routers, and hosts) that is subjected to and/or made to experience a specific network event or network condition. In particular, the system administrator can design or configure an emulated network (e.g., emulated network 107) for a test environment to include any number of emulated network devices that serve as either an INT source element and/or an INT transit element for an INT sink device that is to be subjected to INT network testing via the data plane. For example, FIG. 2 illustrates an exemplary screen display 200 that presents a user interface that can be utilized by a system administrator to design or select one or more individual emulated network components 202 for an emulated device group 204. For example, a system administrator can utilize screen display 200 to select a plurality of emulated components 202 that make up the emulated network generated by TSE engine 106. In some embodiments, the generation and presentation of screen display 200 is supported by management engine 105 and/or TSE engine 106.

Referring back to FIG. 1, the system administrator can issue test system data packet configuration instructions that configure the network testing tool device 102 and/or the TSE engine 106 to generate INT test system data packets that contain emulated INT metadata that makes the representation that the packet traversed and was subsequently modified by emulated network devices of an emulated network (i.e., an indication that represents as if these network devices were actually traversed by the INT data packets). The test system data packets also included emulated INT instructions that indicate the type of INT metadata that is to be recorded (e.g., at each of the transit points/elements). Notably, network test tool device 102 and/or TSE engine 106 can be instructed to generate representative INT test system data packets that are used to test a DUT or a SUT, or any network element that utilizes the in-band telemetry data. Examples of the DUT include an INT sink device, a INT enabled network switch or router, an SDN controller entity, or a segment routing path computation element.

In some embodiments, the test system data packet configuration instructions sent by the system administrator are directed to management engine 105 in network test tool device 102. Management engine 105 is configured to utilize the instructions and parameters received from the administrator's test console to formulate the logical architecture and layout of an emulated network that is represented at least in part in the emulated INT metadata to be included in the test system INT data packets (e.g., emulated network 107 generated by TSE engine 106). Management engine 105 further defines the network telemetry parameters specified in the INT test system data packets to be generated by TSE engine 106. To illustrate, emulated network 107 may be defined as having an emulated source entity 108 and emulated switches 109$_{1 \ldots 3}$. Although only three emulated switches 109$_{1 \ldots 3}$ are depicted in emulated network 107 in FIG. 1, additional switches can be utilized without departing from the scope of the disclosed subject matter. In some alternate embodiments where only a DUT is tested (as opposed to an entire SUT), emulated network 107 may also include an SDN controller emulation 118. After constructing emulated network 107, TSE engine 106 is configured to generate INT test system data packets based on the emulated network represented in the test system data packet generation instructions. In some embodiments, management engine 105 forwards the test instructions and the INT test system packet parameters to TSE engine 106 for test system data packet generation processing.

More specifically, after receiving the test system data packet generation instructions and packet parameters from management engine 105, TSE engine 106 is configured to generate INT test system data packets associated with an emulated network 107 that is defined by the parameters provided by management engine 105. Notably, the INT test system data packet includes telemetry data that represents an INT source and one or more INT transit network devices embedded telemetry metadata in INT test system data packets according to specifications, such as P4 in-band telemetry. More specifically, the telemetry metadata is embedded in between other protocol headers (such as IPv6, TCP/UDP, Geneve, etc.) of the test system data packet as defined in the INT specification.

To illustrate, TSE engine 106 may be configured to generate an INT test system data packet that includes emulated INT metadata indicative of traversing the source entity 108, switch 109$_1$, and switch 109$_3$. Alternatively, TSE engine 106 can generate an INT test system data packet containing emulated INT metadata that indicates that the packet traversed the source entity 108, switch 109$_1$, switch 109$_2$, and switch 109$_3$. Although the telemetry metadata included in the INT test system data packets (e.g., INT records of each transit device) indicates that the packet traversed a plurality of network elements in the emulated network, the INT test system data packets are generated by TSE engine 106 to include all of the representative telemetry metadata at the time of creation (i.e., the INT test system data packets do not actually traverse the network elements of emulated network 107 and collect INT data, but rather feigns and/or fabricates this data as a pretense).

After generating the test system data packets, TSE engine 106 is responsible for sending the test system data packets to an INT sink device under test (e.g., switch DUT 116) and/or a system under test (e.g., SUT 110). For example, FIG. 1 depicts network test tool device 102 and/or TSE engine 106 as generating and issuing an INT test system data packet 120 that includes telemetry data. In this scenario, the telemetry data may include INT data that indicates that the packet originated at source entity 108 and traversed switch 109$_1$ and switch 109$_3$ (e.g., a "2-record" INT packet). In some embodiments, TSE engine 106 directs INT test system data packet 120 via a transmit port of network test tool device 102 to a system under test (e.g., SUT 110). Notably, INT test system data packet 120 is received by a INT capable switch device 111, which can be operating as an INT sink device in SUT 110. Likewise, TSE engine 106 can be configured to send a test system data packet via a transmit port of network test tool device 102 to a specific DUT. For example, FIG. 1 illustrates that network test tool device 102 sends a test system data packet 122 to switch DUT 116, which is functioning as an INT sink device.

After receiving INT test system data packet 122, switch DUT 116 is configured to extract the INT telemetry data contained in the test system data packet. In some embodiments, switch DUT 116 is configured to remove the INT headers included in the INT test system data packet received from network test tool device 102. Notably, the INT headers contain the telemetry metadata inserted by network test tool device 102.

After extracting the telemetry metadata from the test system data packet 120, INT capable switch device 111 can analyze the extracted data to determine whether a telemetry report needs to be generated and sent to an SDN controller device 112 in SUT 110.

Similarly, after receiving the INT test system data packet 122, switch DUT 116 can extract the telemetry data and determine whether a telemetry report needs to be generated and sent to an SDN controller emulation 118 in network test tool device 102. Specifically, SDN controller emulation 118 is an emulated SDN controller entity that logically exists in emulated network 107.

After extracting the telemetry metadata from the test system data packet, switch DUT 116 is configured to analyze the telemetry metadata and determine whether a telemetry report message is to be generated. As used herein, a telemetry report message can be defined as a message sent by an INT sink device to a monitoring system element (e.g., an SDN controller). A telemetry report message includes a 'snapshot' of the original test system data packet (e.g., the inner and outer packet headers). Based on the contents of the original test system data packet, the generation of a telemetry report message can be triggered. In some embodiments, the telemetry report message can be encapsulated by IP and UDP. Notably, such encapsulation facilitates the forwarding of the telemetry report message from the reporting DUT through the data network and to the destination monitoring SDN controller.

For example, the generation of telemetry reports can be triggered when one or more flow parameters of the test system data packets match predefined flow definitions. In some embodiments, the INT sink device can utilize a telemetry access control list, or flow watch list, that determines which test system data packets to monitor by detecting matching parameters in packet header fields. Telemetry report messages are generated for the test system INT data packets that include parameters that match predefined definitions (e.g., tuple data) specified in the access control list or flow watch list. Notably, telemetry report messages include information regarding the path (e.g., source/origin information and transit element information) that INT packets traverse in a network in addition to other telemetry metadata, such as hop latency and queue occupancy at each of the network elements.

In some embodiments, an INT sink device may initiate the generation of a telemetry report message whenever a packet matching a tracked application flow is received or transmitted on a different path than previously received packets. Further, the generation of a telemetry report message can be triggered if the telemetry data indicates a significant change in latency is experienced at a particular hop. The generation of telemetry report messages can be triggered by various events, such as flow monitoring, queue congestion, and packet drops.

In some embodiments, network test tool device 102 includes an SDN controller emulation 118. Notably, SDN controller emulation 118 comprises an emulation element residing in emulated network 107 and is configured to receive and process the telemetry metadata report information contained in the telemetry report message 128 received from a switch DUT 116 via a receive port on the network test tool device 102. For example, SDN controller emulation 118 can extract telemetry data from the telemetry report message 128 and determine whether changes or modifications to emulated network 107 is necessary for continued testing of the INT sink device, i.e., switch DUT 116. Specifically, SDN controller emulation 118 can decide to change emulated network 107. In some embodiments, the SDN controller utilizes the INT telemetry report to assess the performance of the emulated network composed by the plurality of emulated network devices. This assessment based on the telemetry report message can be used to validate the network assessment capability of the SDN controller device using the INT information. After arriving at this decision, SDN controller emulation 118 can issue an instruction message (e.g., at least one non-INT packet) that is communicated via a different protocol (e.g., not P4-INT protocol) to management engine 105. This is described below in additional detail in the description of FIG. 4. In some embodiments, the SDN controller emulation 118 generates a non-INT instruction message containing one or more instructions that direct the network test tool device to modify a network topology of the emulated network and/or modify the INT instructions to record a different set of INT metadata within the at least one INT test system data packet than previous INT test system data packets.

In some embodiments, network test tool device 102 is communicatively connected (via a wireless or wired connection) to SDN controller device 112 in SUT 110. SDN controller device 112 is configured to receive and process the telemetry metadata report information contained in the telemetry report message 124 received from a switch device 111 in SUT 110. For example, SDN controller device 112 can extract telemetry data from the telemetry report message 124 and determine whether changes or modifications to emulated network 107 is necessary for continued testing of SUT 110. Specifically, SDN controller device 112 can decide to change emulated network 107. In some embodiments, the SDN controller device utilizes the INT telemetry report to assess the performance of the emulated network composed by the plurality of emulated network devices. This assessment based on the telemetry report message can be used to validate the network assessment capability of the SDN controller device using the INT information. After arriving at this decision, SDN controller device 112 can issue an instruction message (e.g., at least one non-INT packet) that is communicated via a different protocol (e.g., not P4-INT protocol) to management engine 105 in network test tool device 102. This is described below in additional detail in the description of FIG. 4. In some embodiments, the SDN controller device generates a non-INT instruction message containing one or more instructions that direct the network test tool device to modify a network topology of the emulated network and/or modify the INT instructions to record a different set of INT metadata within the at least one INT test system data packet than previous INT test system data packets.

Upon receiving the instruction message 126 from SDN controller device 112, management engine 105 can logically modify emulated network 107 and/or change the type of metadata that the subsequent INT test system data packets should carry (e.g., instruction message 126 may request to include "queue occupancy" along with "hop latency"). More specifically, INT instructions can be modified by management engine 105 to record a different set of INT metadata within the INT test system data packet as compared to previously processed INT test system data packets. Furthermore, management engine 105 may generate data packet instructions for directing TSE engine 106 to generate test system data packets containing telemetry metadata that indicates that traversal of the packet through the modified emulated network 107. As indicated above, the telemetry metadata included in the test system data packets represents or specifies a packet traversal that did not actually occur (e.g., in a physical network).

Figure 3:
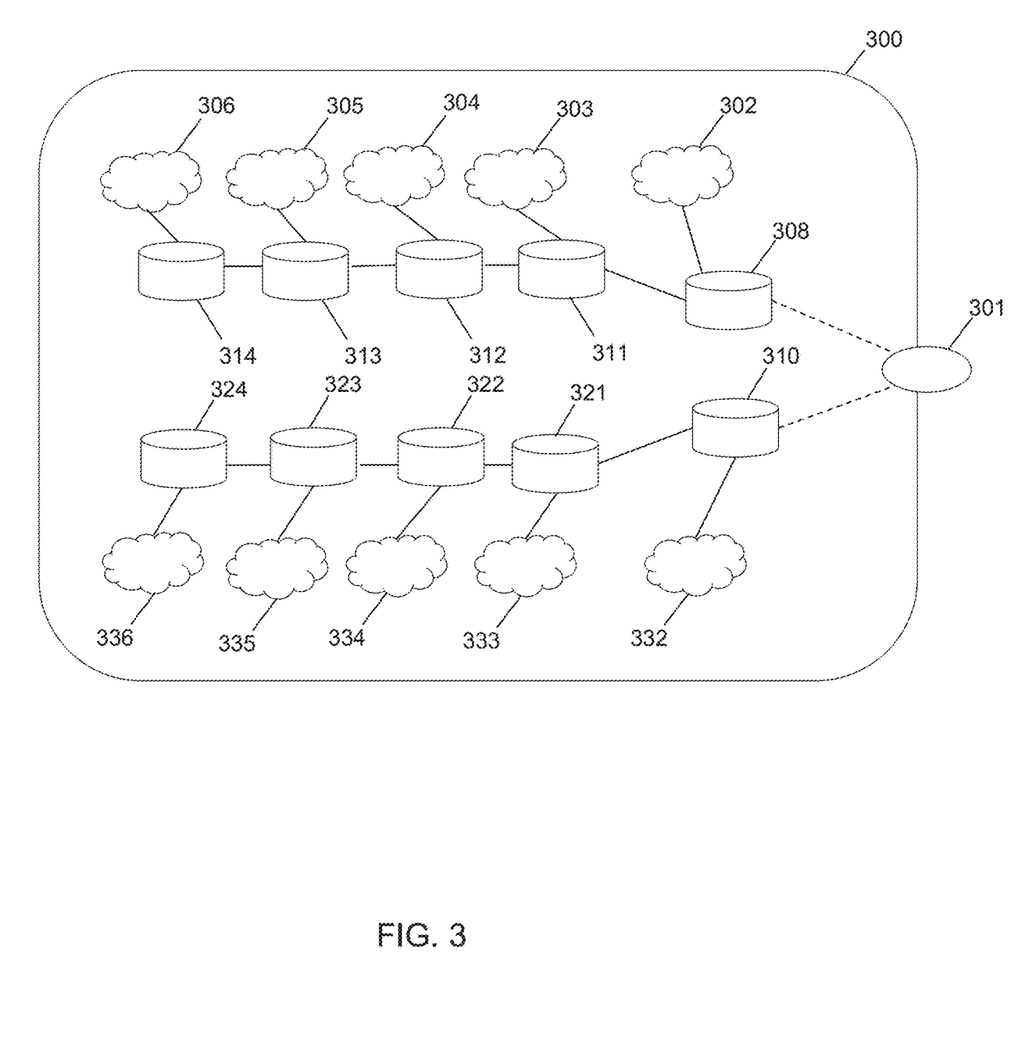
FIG. 3 is a block diagram illustrating an exemplary logical representation of a simulation topology of an INT-capable network emulated by the proposed network test tool device according to an embodiment of the subject matter described herein.

FIG. 3 illustrates a logical representation of a simulated topology 300 corresponding to an emulated network that is generated by a network test tool device and is used to generate INT test system data packets (by the TSE) upon receiving telemetry instructions from a system administrator. In particular, simulated topology 300 represents the emulated network that is designed and managed by a user interface presented on screen display 200 shown in FIG. 2. Simulated topology 300 includes a plurality of simulated and/or emulated network elements 308-324 that can be used to conduct INT testing on an INT-capable SUT and/or INT sink DUT. Specifically, simulated topology 300 includes a first emulation entity, e.g., a router emulation 308 and a second emulation entity, e.g., router emulation 310, each of which represents an emulated INT enabled router or switch that has a direct communication connection to physical test port 301 (e.g., a part of network test tool device 102 in FIG. 1). Further, router emulation 308 is logically coupled to simulated elements 311-314 in series. As used herein, simulated elements 311-314 can include virtual network routers or switches that are simulated by a traffic source emulation engine. Each of simulated elements 311-314 are respectively connected to simulated INT source elements/networks 302-306. Likewise, router emulation 310 is logically coupled to simulation entities 321-324 in series. Notably, simulated topology 300 can be configured to provide a system administrator with a test INT simulation involving the generation of test system data packets that may contain one to five INT records. In the minimum possible scenario, the test system data packet may have only one INT record that represents router emulation 308 and in the maximum possible scenario, the test system data packet may have 5 records corresponding to elements 314, 313, 312, 311, and 308. Although FIG. 2 depicts test port 301 connected to two simulation chains including five virtual network elements each, additional simulation chains comprising any number of virtual network elements can be utilized without departing from the scope of the disclose subject matter.

For example, if a system administrator required an INT test simulation involving a '3-record' INT test system data packet, traffic source emulation engine can be instructed to generate an INT test system data packet that includes telemetry metadata indicating that the test system data packet originated from a source (e.g., network 304) and subsequently traversed simulated switch 312, simulated switch 311, and router emulation 308. Traffic source emulation engine can then send the test system data packet to the device under test or system under test via port 301 of a network test tool device.

Figure 4:
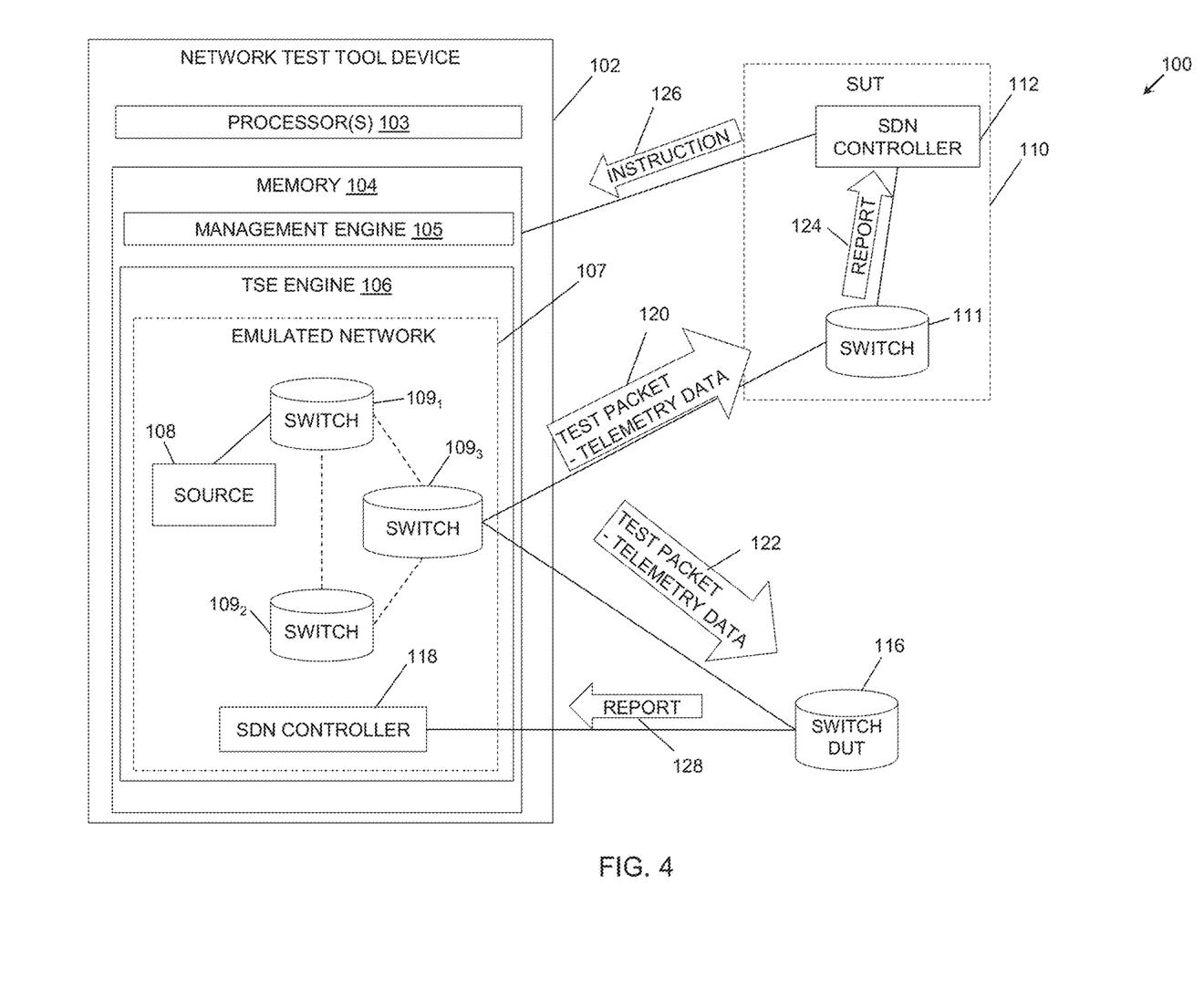
FIG. 4 is a block diagram illustrating an exemplary system for providing instructions for modifying the telemetry information to be recorded by the INT-capable network devices emulated by the proposed network test tool device according to an embodiment of the subject matter described herein.

FIG. 4 illustrates a block diagram of test environment network 100 as comprising a network test tool device 102, a system under test (SUT) 110, and a switch DUT 116, as similarly shown in FIG. 1. As indicated above with respect to some embodiments, switch device 111 in SUT 110 may receive a test system data packet 120 from a network test tool device 102 over a data plane connection. Upon receiving the test system data packet 120, switch device 111 may be configured to extract the contained emulated INT metadata from the received packet. Afterwards, switch device 111 can analyze the extracted telemetry data to determine whether a telemetry report needs to be generated and sent to an SDN controller device 112 in SUT 110. Based on the telemetry metadata contents of the original test system data packet, the generation of a telemetry report message 124 can be triggered at switch device 111. In some embodiments, the generation of a telemetry report message 124 can be triggered when certain flow parameters of the INT test system data packet 120 match predefined flow definitions. For example, switch device 111 functioning as an INT sink device can utilize a telemetry access control list, or flow watch list, that indicates which test system data packets are to be monitored by matching packet header fields. Telemetry reports are generated (by the INT sink device) for test system data packets that include parameters that match predefined definitions (e.g., source and destination address/port tuple data) specified in the flow watch list. Notably, telemetry report messages include information regarding the path that test system data packet 120 apparently/supposedly traversed in addition to other telemetry metadata, such as hop latency and queue occupancy and/or congestion.

In some embodiments, an INT sink device may initiate the generation of a telemetry report message 124 whenever a test system data packet matching a tracked application flow is received or transmitted on a different path than previously received packets. Further, the generation of a telemetry report message can be triggered at the INT sink device if a significant change in latency is indicated at a particular hop. The generation of telemetry report message 124 can also be triggered by various events indicated in the test system data packets, such as flow monitoring, queue congestion, and packet drops.

In some embodiments, telemetry report message 124 can be encapsulated by switch device 111 using IP and/or UDP. In some embodiments, such packet encapsulation facilitates the forwarding of the telemetry report message 124 from the INT sink device (e.g., switch device 111) to the SDN controller device 112. Notably, SDN controller device 112 can extract telemetry data from the received telemetry report message 124 and determine whether changes or modifications to emulated network 107 is necessary for continued testing of SUT 110. After arriving at this determination, SDN controller device 112 can issue an instruction message 126 that is communicated via a different protocol (e.g., not P4-INT protocol). Notably, the instruction message 126 includes instructions for directing management engine 105 to initiate a subsequent INT test session or to modify the current INT test session.

For example, management engine 105 can logically modify emulated network 107 and/or change the type of metadata that the subsequent INT test system data packets should carry (e.g., configure test system data packets to include "queue occupancy" along with hop latency") after receiving instruction message 126 from SDN controller device 112. Furthermore, management engine 105 may generate updated test system data packet configuration instructions for directing TSE engine 106 to generate test system data packets that contain telemetry metadata that indicates and/or represents the traversal of the test system data packet through a modified emulated network 107. As indicated above, the telemetry metadata included in the INT test system data packets represents or specifies a packet traversal that did not actually occur (e.g., in a physical network). Rather, the telemetry metadata contained in the test system data packets are generated with complete telemetry information that represents a traversal through the emulated network from the onset.

FIG. 4 further depicts switch DUT 116 receiving a test system data packet 122 from network test tool device 102 over a data plane connection. Upon receiving the test system data packet 122, switch DUT 116 may be configured to record its own INT metadata within received packet 122 and/or extract the INT metadata from the received packet. Based on the telemetry metadata contents extracted from the test system data packet, the generation of a telemetry report message 128 can be triggered at switch DUT 116. In some embodiments, the generation of a telemetry report message 128 can be triggered when certain flow parameters of the INT test system data packets match predefined flow definitions. For example, switch DUT 116 functioning as an INT sink device can utilize a telemetry access control list, or flow watch list, that indicates which test system data packets are to be monitored by matching packet header fields. Telemetry reports are generated (by the INT sink device) for test system data packets that include parameters that match predefined definitions (e.g., tuple data) specified in the flow watch list. Notably, telemetry report messages include information regarding the path that test system data packets traversed (i.e., specifically, indicated that the test system data packets supposedly traversed) in addition to other telemetry metadata, such as hop latency and queue occupancy and/or congestion.

After generating telemetry report message 128 (with or without its own INT metadata), switch DUT 116 sends the telemetry report message to SDN controller emulation 118 in network test tool device 102. Notably, SDN controller emulation 118 comprises an emulation element residing in emulated network 107 that is functioning as an SDN controller and is configured to receive and process the telemetry metadata report information contained in a telemetry report message 128 received from a switch DUT 116 via a receive port on the network test tool device 102. For example, SDN controller emulation 118 can extract telemetry data from the received telemetry report message 128 and determine whether changes or modifications to emulated network 107 is necessary for continued testing of switch DUT 116. After arriving at this determination, SDN controller emulation 118 can issue an instruction message (not shown, but similar to instruction message 126) that is communicated to management engine 105 and that directs the engine 105 to initiate a subsequent INT test session or to modify the current INT test session. In some embodiments, management engine 105 can logically modify emulated network 107 after receiving instruction message from SDN controller emulation 118. Furthermore, management engine 105 may generate updated test system data packet configuration instructions for directing TSE engine 106 to generate INT test system data packets that contain telemetry metadata that indicates and/or represents the traversal of the test system data packet through a modified emulated network 107.

Figure 5:
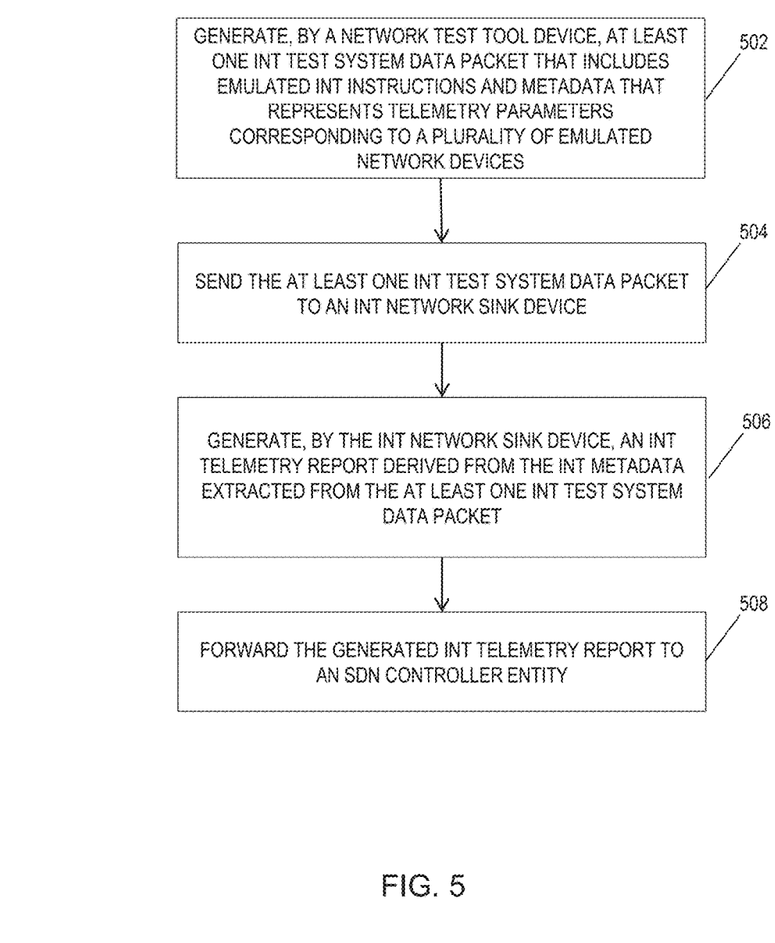
FIG. 5 is a flow chart illustrating an exemplary process for testing network elements of an INT-capable network according to an embodiment of the subject matter described herein.

FIG. 5 is a flow chart illustrating an exemplary method 500 for testing network elements of an in-band telemetry capable network according to an embodiment of the subject matter described herein. In some embodiments, blocks 502-508 of method 500 may represent an algorithm performed by an INT management engine and/or an INT TSE engine that is stored in memory and executed by one or more processors of a network test tool device.

In block 502, method 500 includes generating, by a network test tool device, at least one INT test system data packet that includes emulated INT instructions and emulated INT metadata that represents telemetry parameters corresponding to a plurality of emulated network devices. In some embodiments, the network test tool device includes a management engine that forwards test system packet generation instructions (e.g., test system data packet configuration instructions) to a traffic source emulation engine. The test system packet generation instructions include specifications that direct the TSE engine to create INT test system data packets that include telemetry metadata. Notably, the telemetry metadata included in the INT test system data packet represents the packet's supposed traversal or transit over several emulated network elements in an emulated network hosted by the network test tool device. The TSE engine is configured to emulate various network topologies in accordance with the instructions received from the management engine.

In block 504, method 500 includes sending the at least one INT test system data packet to an INT network sink device. In some embodiments, the TSE engine is configured to transmit the test system data packet to the INT sink device via a data plane connection. Depending on the testing scenario, the INT sink device can either be network switching device that is either the device under test or a network element belonging to an SUT.

In block 506, method 500 includes generating, by the INT network sink device, an INT telemetry report message derived from the emulated INT metadata extracted from the at least one INT test system data packet. In some embodiments, the INT network sink device may extract the telemetry metadata from the received INT test system data packet and generate a telemetry metadata report or digest.

In block 508, method 500 includes forwarding the generated INT telemetry report message to a SDN controller entity. In some embodiments, INT network sink device is configured to send the generated telemetry metadata report to SDN controller entity. For example, the SDN controller entity can comprise a physical network element that belongs to a SUT. In an alternate testing environment scenario, the SDN controller entity comprises an SDN controller emulation that is hosted by the network test tool device.

It should be noted that each of the INT management engine, INT traffic source emulation engine, and/or functionality described herein may constitute a special purpose computing device. Further, the INT management engine, INT traffic source emulation engine, and/or functionality described herein can improve the technological field of computer network equipment testing. More specifically, the disclosed testing system can be configured to operate entirely within a test environment that supports an emulated network. As such, testing and monitoring the manner in which an INT sink DUT or an INT-capable system under test reacts to the receiving of emulated INT instructions and metadata contained in INT test system data packets generated by a network test tool device largely obviates the need to maintain a testing network comprising multiple network elements. Consequently, the network test tool device enables a system administrator to subject a DUT or SUT to INT-based testing without having to configure a physical network to generate the necessary INT metadata contained in an INT packet.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing network elements of an in-band telemetry (INT)-capable network, the method comprising:
    generating, by a network test tool device, at least one INT test system data packet that includes emulated in-band telemetry (INT) metadata that indicates that the at least test system data packet has traversed emulated devices of an emulated network;

sending the at least one INT test system data packet to a system under test (SUT) that includes an INT sink device and a software defined network (SDN) controller for causing the INT sink device to generate and send an INT telemetry report based on the emulated INT metadata to the SDN controller and for causing the SDN controller to assess performance of the emulated network and issue an instruction message based on the assessment; and receiving the instruction message from the SDN controller and evaluating, based on the instruction message, network assessment capability of the SDN controller.

2. The method of claim 1 wherein the instruction message comprises a non-INT instruction message containing one or more instructions that direct the network test tool device to modify a network topology of the emulated network and/or modify the INT instructions to record a different set of INT metadata within the at least one INT test system data packet than previous INT test system data packets.

3. The method of claim 2 wherein the network test tool device modifies the emulated INT metadata included in the at least one INT test system data packet to record a change in network topology.

4. The method of claim 1 wherein the telemetry parameters represent a user-defined test case specifying at least one predefined network event.

5. The method of claim 1 wherein the sending of the at least one INT test system data packet to the SUT causes to SDN controller to provide, to a management engine in the network test tool device, a status description indicative of real-time control functionality in response to receiving the INT telemetry report.

6. A system for testing network elements of an in-band telemetry (INT)-capable network, the system comprising:
a network test tool device comprising at least one processor and a memory;
an INT traffic source emulation engine that when stored in memory and executed by the at least one processor is configured for generating at least one INT test system data packet that includes emulated INT metadata that indicates that the at least test system data packet has traversed emulated devices of an emulated network, and for sending the at least one INT test system data packet to a system under test (SUT) that includes an INT sink device and a software defined network (SDN) controller for causing the INT sink device to generate and send an INT telemetry report based on the emulated INT metadata to the SDN controller and for causing the SDN controller to assess performance of the emulated network and issue an instruction message based on the assessment; and
a management engine for receiving the instruction message from the SDN controller and evaluating, based on the instruction message, network assessment capability of the SDN controller.

7. The system of claim 6 wherein the instruction message comprises a non-INT instruction message containing one or more instructions that direct the network test tool device to modify a network topology of the emulated network and/or modify the INT instructions to record a different set of INT metadata within the at least one INT test system data packet than previous INT test system data packets.

8. The system of claim 7 wherein the network test tool device modifies the emulated INT metadata included in the at least one INT test system data packet to record a change in network topology.

9. The system of claim 6 wherein the telemetry parameters represent a user-defined test case specifying at least one predefined network event.

10. The system of claim 6 wherein the sending of the at least one INT test system data packet to the SUT causes the SDN controller to provide to the network test tool device a status description indicative of real-time control functionality in response to the receiving the INT telemetry report.

11. A non-transitory computer readable medium having stored thereon executable instructions that when executed by a processor of a computer control the computer to perform steps comprising:
generating, by a network test tool device, at least one INT test system data packet that includes emulated in-band telemetry (INT) metadata that indicates that the at least test system data packet has traversed emulated devices of an emulated network;
sending the at least one INT test system data packet to a system under test (SUT) that includes an INT sink device and a software defined network (SDN) controller for causing the INT sink device to generate and send an INT telemetry report based on the emulated INT metadata to the SDN controller and for causing the SDN controller to assess performance of the emulated network and issue an instruction message based on the assessment; and
receiving the instruction message from the SDN controller and evaluating, based on the instruction message, network assessment capability of the SDN controller.

12. The non-transitory computer readable medium of claim 11 wherein the instruction message comprises a non-INT instruction message containing one or more instructions that direct the network test tool device to modify the INT instructions to record a different set of INT metadata within the INT test system data packet than previous INT test system data packets and/or modify network topology of the emulated network.

13. The non-transitory computer readable medium of claim 12 wherein the network test tool device modifies the emulated INT metadata included in the at least one INT test system data packet to record a change in network topology.

14. The non-transitory computer readable medium of claim 11 wherein the telemetry parameters represent a user-defined test case specifying at least one predefined network event or at least one predefined network condition.

15. The system of claim 11 wherein the sending of the at least one INT test system data packet to the SUT causes the SDN controller to provide to the network test tool device a status description indicative of real-time control functionality in response to the receiving the INT telemetry report.

* * * * *

UNITED STATES PATENT AND TRADEMARK OFFICE
CERTIFICATE OF CORRECTION

PATENT NO. : 10,868,730 B2
APPLICATION NO. : 16/869129
DATED : December 15, 2020
INVENTOR(S) : Suvendu Mozumdar et al.

Page 1 of 1

It is certified that error appears in the above-identified patent and that said Letters Patent is hereby corrected as shown below:

On the Title Page

Item (56), in Column 2, under "Other Publications", Line 1, delete "16/269,798" and insert -- 16/269,498 --, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*